US012759878B2

(12) United States Patent
Hanif et al.

(10) Patent No.: US 12,759,878 B2
(45) Date of Patent: Oct. 13, 2026

(54) SURFACE-TREATED BORON NITRIDE NANO TUBE AND SURFACE TREATMENT METHOD OF BORON NITRIDE NANO TUBE

(71) Applicant: Naieel Technology Inc., Daejeon (KR)

(72) Inventors: Zahid Hanif, Daejeon (KR); Ki In Choi, Daejeon (KR); Jae Woo Kim, Daejeon (KR)

(73) Assignee: Naieel Technology Inc., Daejeon (KR)

( * ) Notice: Subject to any disclaimer, the term of this patent is extended or adjusted under 35 U.S.C. 154(b) by 814 days.

(21) Appl. No.: 18/073,492

(22) Filed: Dec. 1, 2022

(65) Prior Publication Data

US 2024/0158231 A1 May 16, 2024

(51) Int. Cl.
*C01B 21/064* (2006.01)
*B82Y 30/00* (2011.01)
*B82Y 40/00* (2011.01)

(52) U.S. Cl.
CPC ........... *C01B 21/0648* (2013.01); *B82Y 30/00* (2013.01); *B82Y 40/00* (2013.01); *C01P 2004/13* (2013.01)

(58) Field of Classification Search
None
See application file for complete search history.

(56) References Cited

FOREIGN PATENT DOCUMENTS

| | | | |
|---|---|---|---|
| JP | 2022041651 | A | 3/2022 |
| KR | 1020190017144 | A | 2/2019 |
| KR | 102105364 | B1 | 4/2020 |
| KR | 1020200062026 | A | 6/2020 |
| KR | 1020210099586 | A | 8/2021 |
| WO | 2017131005 | A1 | 8/2017 |

OTHER PUBLICATIONS

Jeong et al.; KR 10-2105364; translation provided by Google Patents Sep. 16, 2025.*
Zhang et al.; Improved Thermal Conductivity of Polymer Composites by Noncovalent Modification of Boron Nitride via Tannic Acid Chemistry; Ind. Eng. Chem. Res., 60, 12570-12578; 2021.*
Nogami; JP2022041651; translation provided by Google Patents Feb. 7, 2026.*
Hu, Zhen et al., "One-Pot Water-Based Hydrophobic Surface Modification of Cellulose Nanocrystals Using Plant Polyphenols", ACS Sustainable Chemistry & Engineering, vo., 5, No. 6, pp. 5018-5026, Apr. 2017.

* cited by examiner

*Primary Examiner* — Guinever S Gregorio
(74) *Attorney, Agent, or Firm* — Dinsmore & Shohl LLP; Yongsok Choi, Esq.

(57) ABSTRACT

Provided is a surface-treated boron nitride nanotubes including a boron nitride nanotubes, and a first layer located on at least a portion of a surface of the boron nitride nanotubes, wherein the first layer forms Pi (π) bonds with the boron nitride nanotubes, and the first layer includes hydroxyphenyl groups.

6 Claims, 14 Drawing Sheets

FIG. 11A
Water
5mg
EtOH
5mg
Toluene
5mg

FIG. 11B
Water
5mg
EtOH
5mg
Toluene
5mg

SURFACE-TREATED BORON NITRIDE NANO TUBE AND SURFACE TREATMENT METHOD OF BORON NITRIDE NANO TUBE

CROSS-REFERENCE TO RELATED APPLICATION

This application is based on and claims priority under 35 U.S.C. § 119 to Korean Patent Application No. 10-2022-0152967, filed on Nov. 15, 2022, in the Korean Intellectual Property Office, the disclosure of which is incorporated by reference herein in its entirety.

BACKGROUND

1. Field

The present disclosure generally relates to a boron nitride nanotubes (BNNT). More particularly, the present disclosure relates to a surface-treated boron nitride nanotubes (BNNT), and surface treatment method of boron nitride nanotubess (BNNT).

2. Description of the Related Art

A boron nitride nanotubes (BNNT) has structural similarity to a carbon nanotube (CNT), but has a hexagonal structure in which carbon atoms of CNT, which is a carbon monoatomic hexagonal, are substituted with boron atoms and nitrogen atoms. BNNT has excellent mechanical strength and high thermal conductivity due to its structure similar to that of CNT, and also a wide band gap due to the alternating bonding of boron and nitrogen, and thus, has insulating properties, high oxidation resistance, and chemical resistance.

In order to apply the excellent properties of BNNT to various fields, it is a very important to secure dispersion quality of BNNT in a dispersion medium. However, BNNT has low dispersibility in organic and aqueous solvents, limiting practical application of BNNT. Therefore, in order to practically apply BNNT in various fields, it is necessary to make BNNT to disperse in various solvents.

SUMMARY

Embodiments of the present disclosure provide a surface-treated boron nitride nanotubes having excellent dispersibility in a hydrophilic or hydrophobic solvent, and a surface treatment method of the boron nitride nanotubes.

Additional aspects will be set forth in part in the description which follows and, in part, will be apparent from the description, or may be learned by practice of the presented embodiments of the disclosure.

An embodiment of the present disclosure discloses a surface-treated boron nitride nanotubes including: a boron nitride nanotubes; and a first layer located on at least a portion of a surface of the boron nitride nanotubes, wherein the first layer forms Pi (π) bonds with boron nitride nanotubess, and the first layer includes hydroxyphenyl groups.

In this embodiment, the first layer may include at least one of tannic acid, gallic acid, catechol, epigallocatechin, pyrogallol, hexahydroxydiphenic acid, ellagic acid, and chlorogenic acid, as a polyphenol group.

In this embodiment, the surface-treated boron nitride nanotubes may be hydrophilic.

In this embodiment, a second layer may be further included on the first layer, wherein the second layer may include amine groups or thiol groups, as hydrocarbon groups.

In this embodiment, the amine groups or the thiol groups may be added to the hydroxyl groups of the first layer by Michael addition.

In this embodiment, the second layer may include at least one of alkyl amine, alkyl thiol, aryl amine, aryl thiol, benzyl amine, and benzyl thiol.

In this embodiment, the surface-treated boron nitride nanotubes may have hydrophobicity by the second layer.

Another embodiment of the present disclosure discloses a surface treatment method of boron nitride nanotubes, including: mixing a first surface treatment agent in water to form a mixed solution; dispersing boron nitride nanotubess in the mixed solution to form a dispersion; and washing the boron nitride nanotubess from the dispersion and drying the same, wherein pH of the dispersion is about 8 to about 9, and a first layer including hydroxyphenyl groups is formed on at least a portion of the surface of the dried boron nitride nanotubess.

In this embodiment, the first surface treatment agent may include at least one of tannic acid, gallic acid, catechol, epigallocatechin, pyrogallol, hexahydroxydiphenic acid, ellagic acid, and chlorogenic acid.

In this embodiment, mixing a second surface treatment agent in the dispersion may be further included before the washing and drying, and a second layer may be additionally formed on the first layer by mixing the second surface treatment agent, wherein the second layer may include amine groups or thiol groups as hydrocarbon groups added to the hydroxyl groups of the first layer by Michael addition.

In this embodiment, the second surface treatment agent may include at least one of alkyl amine, alkyl thiol, aryl amine, aryl thiol, benzyl amine, and benzyl thiol.

In this embodiment, boron nitride nanotubess may be changed from being hydrophilic to hydrophobic by the second layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
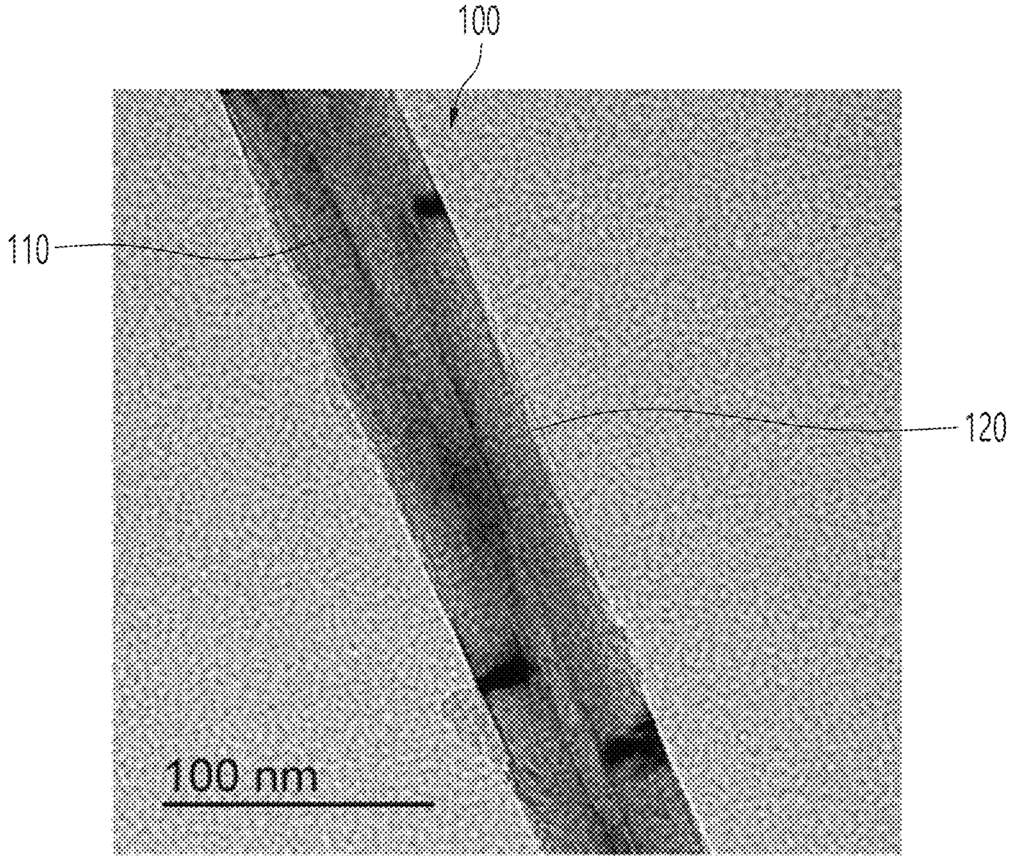
FIG. 1 shows a transmission electron microscope (TEM) image of an example of a boron nitride nanotubes according to an embodiment of the present disclosure.

Reference will now be made in detail to embodiments, embodiments of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of at least one of the associated listed items. Expressions such as "at least one of," when preceding a list of elements, modify the entire list of elements and do not modify the individual elements of the list.

The present disclosure may be modified in various forms and have many embodiments, and particular embodiments are illustrated in the drawings and are described in the detailed description. Effects and features of the present disclosure, and methods of achieving the same, will become apparent with reference to the embodiments described below in detail in conjunction with the drawings. However, the present disclosure is not limited to the embodiments disclosed below and may be implemented in various forms.

In the following embodiments, terms such as first, second, etc. are used for the purpose of distinguishing one component from another, not in a limiting sense.

In the following embodiments, the singular of any term includes the plural, unless the context otherwise requires.

In the following embodiments, the terms such as "include" or "have" means that the features or elements described in the specification are present, and do not preclude the possibility that one or more other features or elements will be added.

In the following embodiments, when it is said that a part such as a film, region, or component is above or on another part, it includes not only a case in which the part is directly on another part, but also cases in which other film(s), region(s), component(s), etc. are interposed therebetween.

In the drawings, sizes of the components may be exaggerated or reduced for convenience of description. For example, since sizes and thicknesses of each component shown in the drawings are arbitrarily indicated for convenience of description, the present disclosure is not necessarily limited to the illustration.

Hereinafter, embodiments of the present disclosure will be described in detail with reference to the accompanying drawings, and the same or corresponding components will be given the same reference numerals when described with reference to the drawings.

Figure 2:
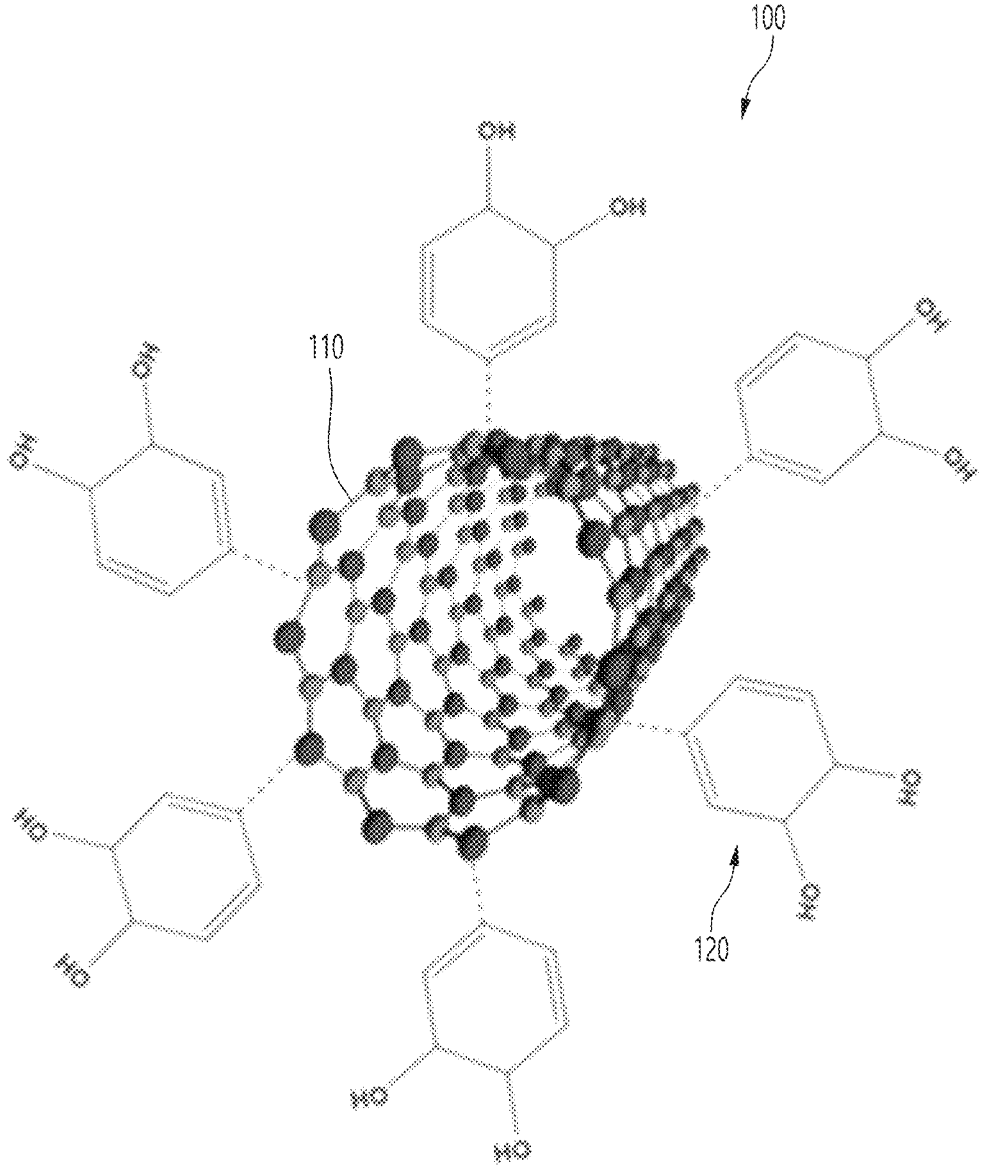
FIG. 2 shows a structural formula illustrating the boron nitride nanotubes of FIG. 1.

FIG. 1 shows a transmission electron microscope (TEM) image of an example of a boron nitride nanotubes according to an embodiment of the present disclosure, and FIG. 2 shows a structural formula illustrating the boron nitride nanotubes of FIG. 1.

Referring to FIGS. 1 and 2, the surface-treated boron nitride nanotubes 100 according to an embodiment may include a boron nitride nanotubes 110 and a first layer 120 on the surface of boron nitride nanotubes 110.

As shown in FIG. 2, a boron nitride nanotubes 110 is a hexagonal nanotube in which nitrogen and carbon are alternately arranged, and has excellent thermal conductivity, but has a wide bandgap and electrically insulating characteristics similar to ceramic. Therefore, boron nitride nanotubess 110 are electrical insulators but may be applied as a high thermal conductivity composite.

In addition, as boron nitride nanotubess 110 are known to have excellent mechanical properties, chemical resistance and oxidation resistance, to absorb thermal neutrons, and to be harmless to the human body, boron nitride nanotubess may be applied in various industrial fields such as electronics industry, energy, space, nuclear power, and bio-medical fields.

However, since these boron nitride nanotubess 110 are generally not dispersed in organic and aqueous solvents, in order to actually apply boron nitride nanotubess 110 industrially, boron nitride nanotubes 110 need to be made to have hydrophilic or hydrophobic properties.

To this end, the present disclosure may make boron nitride nanotubess 110 to be dispersed in a polar solvent, by imparting hydrophilicity to the boron nitride nanotubess 110, by forming a first layer 120 on at least a portion of a surface of the boron nitride nanotubes 110.

The first layer 120 may form Pi (n) bonds with the boron nitride nanotubess 110 and may include hydroxyphenyl groups. For example, the first layer 120 may include at least one of tannic acid, gallic acid, catechol, epigallocatechin, pyrogallol, hexahydroxydiphenic acid, ellagic acid and chlorogenic acid, as a polyphenol group.

The polyphenol group of the first layer 120 may be oxidized to a highly reactive quinone oligomer and attached to the surface of the boron nitride nanotubes 110, and the first layer 120 may be formed on the boron nitride nanotubes 110, by strong interaction between catechol molecules of the polyphenol group and the boron nitride nanotubes 110 through van der Waals bonding and Pi-Pi ($\pi$-$\pi$) stacking.

As such, as the first layer 120 is formed on at least a portion of the surface of the boron nitride nanotubess 110, hydroxyl groups come to exist on the surface of the boron nitride nanotubess 110, and thus, the surface-treated boron nitride nanotubess (110) may have hydrophilicity.

Meanwhile, tannic acid, etc., included in the first layer 120 are an environmentally friendly material derived from nature, and the surface-treated boron nitride nanotubes 110 may not cause environmental pollution.

Figure 3:
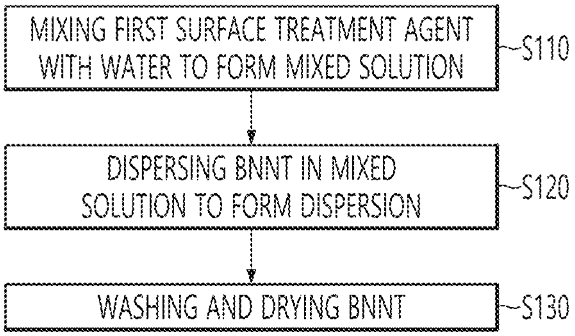
FIG. 3 shows a flowchart schematically illustrating an example of a surface treatment method of the boron nitride nanotubes of FIG. 1.

FIG. 3 shows a flowchart schematically illustrating an example of a surface treatment method of the boron nitride nanotubes of FIG. 1.

Referring to FIG. 3, a surface treatment method of boron nitride nanotubess according to an embodiment of the present disclosure may include: mixing a first surface treatment agent in water to form a mixed solution (S110); dispersing boron nitride nanotubess in the mixed solution to form a dispersion (S120); and washing the boron nitride nanotubess from the dispersion and drying the same (S130).

The first surface treatment agent is a material capable of forming the first layer, and may include a hydroxyphenyl group. In an example, the first surface treatment agent may include at least one of tannic acid, gallic acid, catechol, epigallocatechin, pyrogallol, hexahydroxydiphenic acid, ellagic acid and chlorogenic acid, as a polyphenol group.

The first surface treatment agent may be included in an amount of 0.1 wt. % to 0.2 wt. %, with respect to the entire mixture. When a content of the first surface treatment agent in the mixed solution is less than 0.1 wt %, it is difficult to form the first layer capable of imparting hydrophilicity to boron nitride nanotubess. On the other hand, even when a content of the first surface treatment agent is greater than 0.2 wt %, the surface treatment effect on boron nitride nanotubess does not continuously increase. Therefore, a content of the first surface treatment agent may be preferably 0.1 wt % to 0.2 wt % with respect to the entire mixture.

Subsequently, boron nitride nanotubess are dispersed in the mixed solution (S120). The dispersion may be performed by ultrasonic dispersion, stirring, or the like.

In this regard, the dispersion may be slightly alkaline. Since the dispersion has weak alkalinity, the polyphenol group may be oxidized to a highly reactive quinone oligomer by dissolved oxygen in the dispersion, and as a result, the quinone oligomer may be attached to the surface of the boron nitride nanotubess 110, and the first layer may be formed.

pH of the dispersion may be adjusted with a base such as sodium hydroxide. In an example, pH of the dispersion may be 8 to 9. When pH of the dispersion is less than 8 or higher than 9, quinone oligomers are difficult to be formed, and thus, pH of the dispersion may be preferably 8 to 9.

A mixing ratio of the boron nitride nanotubess and the first surface treatment agent dispersed in the dispersion may be 1:1 to 1:0.1 by wt %. When a content of the boron nitride nanotubess dispersed in the dispersion exceeds 10 times that of the first surface treating agent, it may be difficult to effectively form the first layer on the surface of the boron nitride nanotubess. On the other hand, when a content of the boron nitride nanotubess dispersed in the dispersion is less than one time compared to that of the first surface treatment agent, the amount of the first surface treatment agent discarded in the subsequent washing process increases rapidly.

After dispersing boron nitride nanotubess in the mixed solution to form a dispersion, the boron nitride nanotubess on which the first layer is formed are washed and dried (S130).

In the washing, the boron nitride nanotubess are washed in water to remove residual polyphenol groups. Subsequently, only the boron nitride nanotubess are collected through centrifugation or filtering, and then dried to obtain a powder of boron nitride nanotubess surface-treated to have hydrophilicity.

The above method may be carried out at room temperature and atmospheric conditions. Therefore, according to the present disclosure, it is possible to impart hydrophilicity to boron nitride nanotubess by a simple method of dispersing boron nitride nanotubess in a mixed solution in which the first surface treatment agent is mixed in water without creating a specific environment. In addition, as may be seen in FIG. 1, the first layer may be formed without damaging the boron nitride nanotubess.

Figure 4:
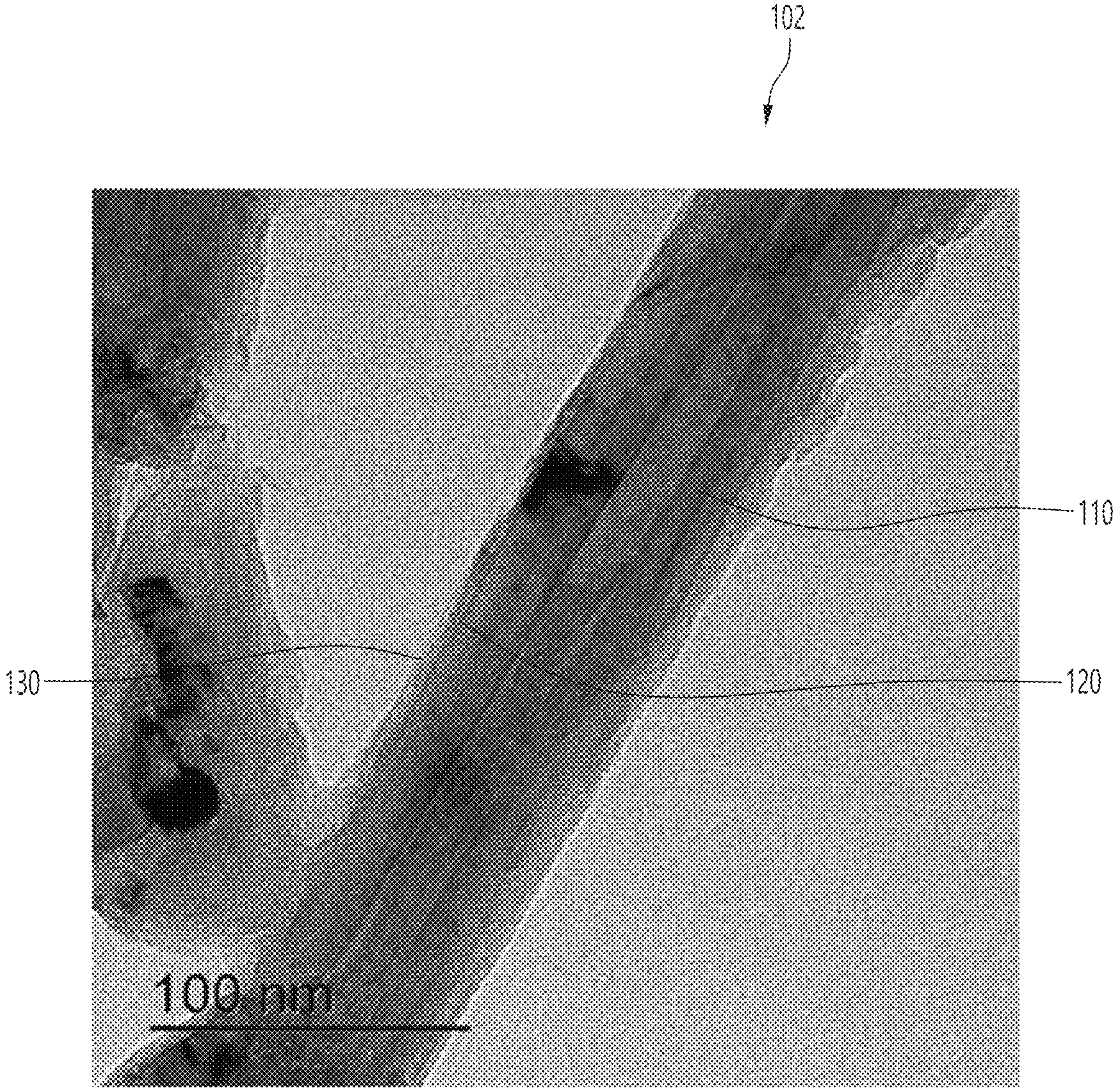
FIG. 4 shows a transmission electron microscope (TEM) image of an example of a boron nitride nanotubes according to an embodiment of the present disclosure.
Figure 5:
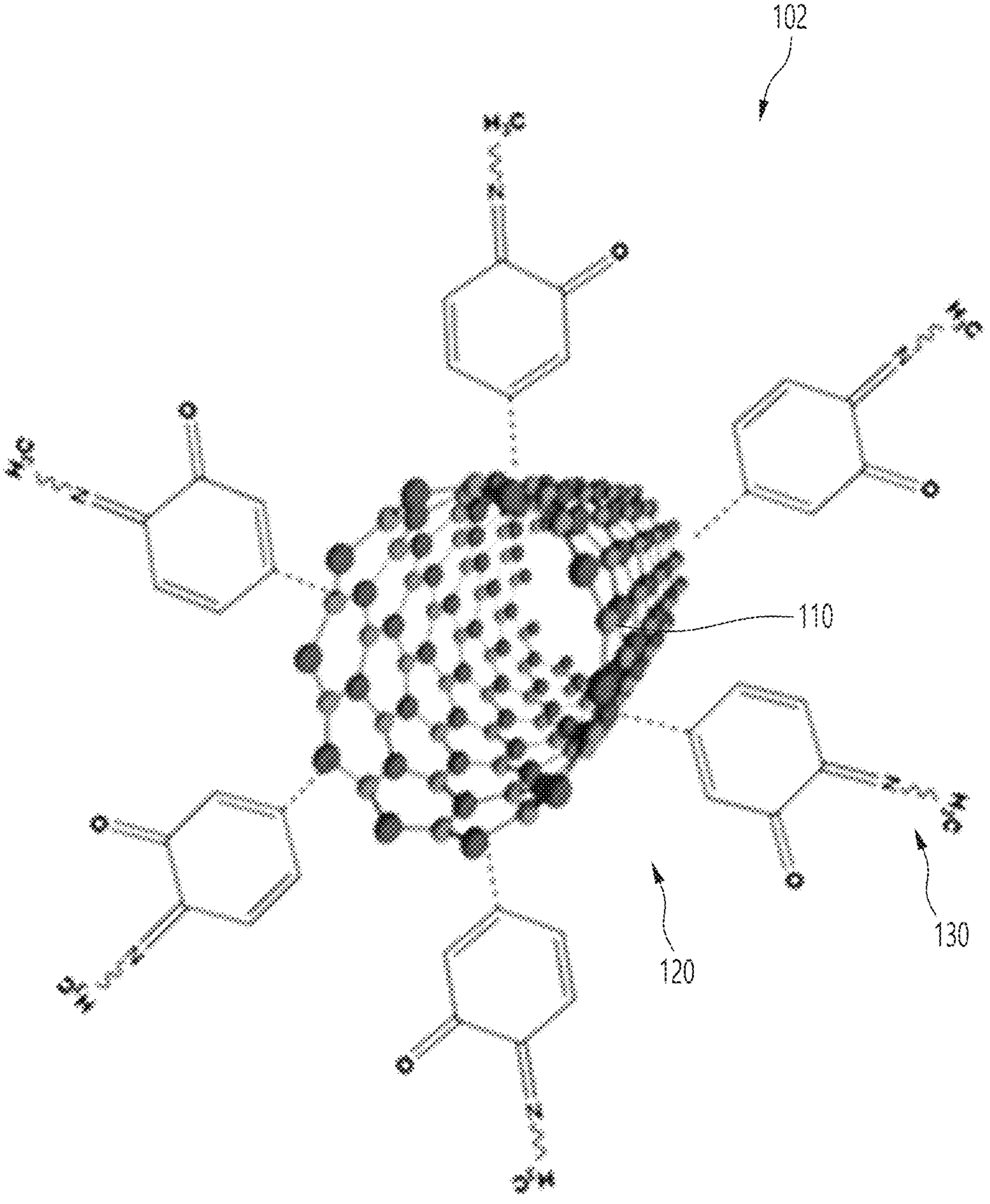
FIG. 5 shows a structural formula illustrating the boron nitride nanotubes of FIG. 4.

FIG. 4 shows a transmission electron microscope (TEM) image of an example of a boron nitride nanotubes according to an embodiment of the present disclosure; and FIG. 5 shows a structural formula illustrating the boron nitride nanotubes of FIG. 4.

Referring to FIGS. 4 and 5, the surface-treated boron nitride nanotubes 102 according to an embodiment may include: a boron nitride nanotubes 110, a first layer 120 on a surface of the boron nitride nanotubes 110, and a second layer 130 on the first layer 120.

A boron nitride nanotubes 110 is a hexagonal nanotube in which nitrogen and carbon are alternately arranged, and a first layer 120 forms Pi (π) bonds with the boron nitride nanotubess 110, and may include hydroxyphenyl groups. For example, the first layer 120 may include at least one of tannic acid, gallic acid, catechol, epigallocatechin, pyrogallol, hexahydroxydiphenic acid, ellagic acid and chlorogenic acid as a polyphenol group.

The second layer 130 is a layer for imparting hydrophobicity to the boron nitride nanotubes 110, and may include amine groups or thiol groups as hydrocarbon groups. For example, the second layer 130 may include at least one of alkyl amine, alkyl thiol, aryl amine, aryl thiol, benzyl amine, and benzyl thiol.

On the other hand, the polyphenol group of the first layer 120 may be oxidized to a highly reactive quinone oligomer and be attached to the surface of the boron nitride nanotubes 110, and thus attached quinone structure may anchor a primary amine group of the second layer 130 by a Michael addition mechanism. More specifically, the reaction of the amine or thiol of the second layer 130 and the hydroxyl groups of the first layer 120 is an addition of amine or thiol of the second layer 130 to the hydroxyl groups of the first layer 120 by Michael addition, whereby the second layer 130 may be formed on the first layer 120.

When such a second layer 130 is further included, the surface-treated boron nitride nanotubess 120 come to have hydrophobicity, so that dispersibility in an organic solvent such as toluene may be improved.

Figure 6:
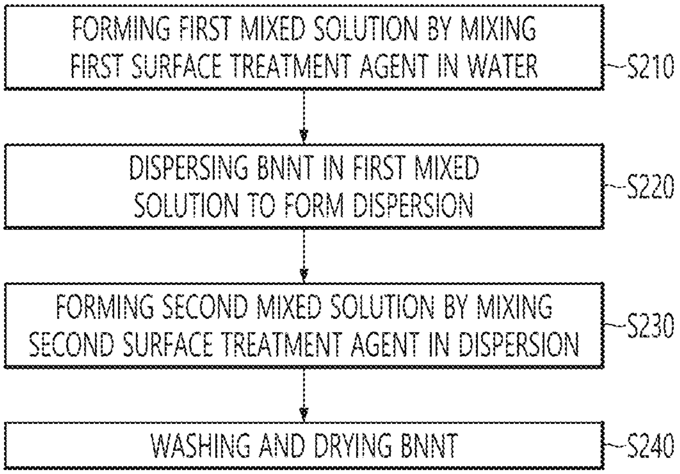
FIG. 6 shows a flowchart schematically illustrating an example of a surface treatment method of the boron nitride nanotubes of FIG. 4.

FIG. 6 shows a flowchart schematically illustrating an example of a surface treatment method of the boron nitride nanotubes of FIG. 4.

Referring to FIG. 6, a surface treatment method of boron nitride nanotubess according to an embodiment of the present disclosure may include: mixing a first surface treating agent with water to form a first mixed solution (S210); dispersing boron nanotubes in the first mixed solution to form a dispersion (S220); mixing a second surface treatment agent in the dispersion to form a second mixture (S230); and washing the boron nitride nanotubess from the second mixture and drying the same (S240).

Since forming the first mixture (S210) and the forming the dispersion (S220) are the same as forming the mixture of FIG. 3 (S110 of FIG. 3) and the forming the dispersion (S120 of FIG. 3), descriptions thereof will not be repeated, and only differences from FIG. 3 will be described.

Referring to FIG. 6, after forming the dispersion, a second surface treatment agent is further mixed with the dispersion to form a second mixed solution (S230). The second surface treating agent is a material for imparting hydrophobicity to the boron nitride nanotubess, and may include amine groups or thiol groups as hydrocarbon groups, which is capable of being added to the hydroxyl groups of the first layer 120 by Michael addition.

In an example, the second surface treatment agent may include at least one of alkyl amine, alkyl thiol, aryl amine, aryl thiol, benzyl amine, and benzyl thiol.

A mixing amount of the second surface treatment agent may be 0.5 times to 2 times the mixing amount of boron nitride nanotubess. When a mixing amount of the second surface treatment agent is less than 0.5 times the mixing amount of boron nitride nanotubess, it is difficult to form the second layer, and thus, it is difficult to change the boron nitride nanotubess to have hydrophobicity, and when a mixing amount of the second surface treatment agent is greater than 2 times the mixing amount of boron nitride nanotubess, the amount of the second surface treatment agent discarded in the subsequent washing process increases rapidly.

After dispersing boron nitride nanotubess in the second mixture to form a dispersion, the boron nitride nanotubess on which the second layer is formed are washed and dried (S240).

In the washing, the boron nitride nanotubess are sequentially washed in water and ethanol to remove the remaining polyphenol groups and hydrocarbon groups. Subsequently, only the boron nitride nanotubess are collected by centrifugation or filtering, and then dried to obtain a powder of boron nitride nanotubess surface-treated to have hydrophobicity.

On the other hand, unlike the above method, as a result of mixing the second surface treatment agent in an organic solvent such as toluene and dispersing the boron nitride nanotubess, the second layer was not formed on the surface of the boron nitride nanotubess, and thus, hydrophobicity could not be imparted to the boron nitride nanotubess. That is, in order to form the second layer, the first layer must be previously formed on the surface of the boron nitride nanotubes by the first surface treatment agent.

The above method may be carried out at room temperature and atmospheric conditions. Therefore, according to the present disclosure, it is possible to impart hydrophobicity to boron nitride nanotubess by a simple method of dispersing boron nitride nanotubess in a mixed solution in which the first surface treatment agent is mixed in water, and then additionally mixing the second surface treatment agent without creating a specific environment. In addition, according to the present method, since water is used as a dispersion medium in the process of surface-treating the boron nitride nanotubes to have hydrophobicity, a problem of environmental pollution due to a use of an organic solvent does not occur. In addition, as may be seen in FIG. 4, the second layer may be formed without damaging the boron nitride nanotubess.

Figure 7:
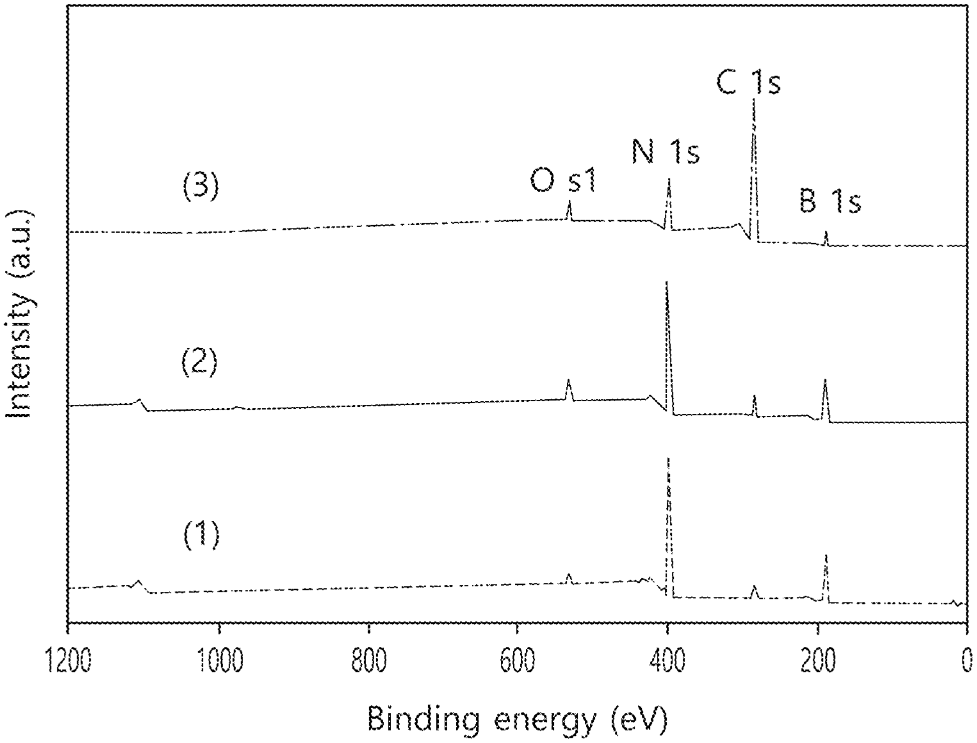
FIG. 7 shows a diagram showing results of measuring compositions of the boron nitride nanotubess according to examples of the present disclosure and a comparative example.

FIG. 7 shows a diagram showing results of measuring compositions of the boron nitride nanotubess according to examples and a comparative example.

(1) of FIG. 7 shows results of analyzing the composition of boron nitride nanotubess that are not surface-treated (hereinafter, referred to as a 'comparative example'), and (2) of FIG. 7 shows results of analyzing the composition of boron nitride nanotubess in which a first layer is formed on the surface (hereinafter referred to as 'Example 1'), and (3) of FIG. 7 shows results of analyzing the composition of boron nitride nanotubess in which a second layer is additionally formed on the first layer (hereinafter referred to as 'Example 2').

In Example 1, the first layer was formed by the following method.

0.1 g of tannic acid was mixed in 100 mL of water, and bath sonication was performed for 10 minutes to form a mixed solution, then 1 g of boron nitride nanotubes powder was added to the mixed solution, and tip sonication was performed for 60 minutes to form a dispersion. In this regard, sodium hydroxide was mixed with the mixed solution so as to make a pH of 8. The surface-treated boron nitride nanotubess in the dispersion were washed with water, collected by filtering or centrifugation, and then dried at a temperature of 80° C. for 8 hours.

In Example 2, the second layer was formed by the following method.

0.1 g of tannic acid was mixed in 100 mL of water, and bath sonication was performed for 10 minutes to form a mixed solution, then 1 g of boron nitride nanotubes powder was added to the mixed solution, and tip sonication was performed for 60 minutes to form a dispersion. In this regard, sodium hydroxide was mixed with the mixed solution so as to make a pH of 8.2 g of alkylamine was added to the dispersion, and tip sonication was performed for 60 minutes. Subsequently, the surface-treated boron nitride nanotubess were washed with water and ethanol, collected by filtering or centrifugation, and then dried at a temperature of 80° C. for 8 hours.

A surface of a boron nitride nanotubes is mostly composed of boron (B), nitrogen (N), carbon (C), and oxygen (O), and referring to FIG. 7, the surface of the boron nitride nanotubes of Comparative Example (1) was composed of 50.07% (atomic weight) of boron (B), 41.17% (atomic weight) of nitrogen (N), 6.37% (atomic weight) of carbon (C), and 2.4% (atomic weight) of oxygen (O).

In the case of Example 1 (2), the surface of the surface-treated boron nitride nanotubes was composed of 45.74% (atomic weight) of boron (B), 37.41% (atomic weight) of nitrogen (N), 12.51% (atomic weight) of carbon (C), and 4.35% (atomic weight) of oxygen (O).

In the case of Example 2 (3), the surface of the surface-treated boron nitride nanotubes was composed of 17.42% (atomic weight) of boron (B), 15.04% (atomic weight) of nitrogen (N), 62.79% (atomic weight) of carbon (C), and 4.12% (atomic weight) of oxygen (O).

When Example 1 (2) and Example 2 (3) are compared with Comparative Example (1), the contents of carbon (C) and oxygen (O) are increased, and the contents of boron (B) and nitrogen (N) are relatively decreased. This is a result of the formation of the first layer and the second layer on the surface of the boron nitride nanotubes.

Figure 8:
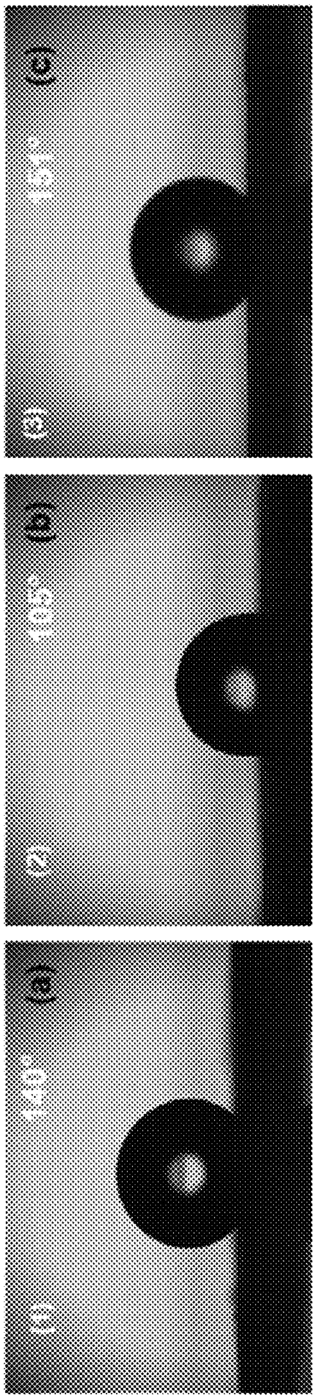
FIG. 8 shows a photograph showing contact angles of the boron nitride nanotubess according to examples of the present disclosure and a comparative example.

FIG. 8 shows a photograph showing contact angles of the boron nitride nanotubess according to examples and a comparative example.

In FIG. 8, the contact angles were measured by dripping water droplets after coating the boron nitride nanotubess on a glass substrate. (1) of FIG. 8 shows the contact angle of the comparative example, (2) of FIG. 8 shows the contact angle of Example 1, and (3) of FIG. 8 shows the contact angle of Example 2.

As a result, in the case of the boron nitride nanotubess without surface treatment (comparative example), the contact angle was 140° as shown in (1) of FIG. 8, but when a first layer was formed on the surface of the boron nitride nanotubess (Example 1), as may be seen that in (2) of FIG. 8, the contact angle was reduced to 105°. This is a result of surface-treating the boron nitride nanotubess to have hydrophilicity by the first layer.

In addition, when the second layer was also formed on the surface of the boron nitride nanotubess (Example 2), the contact angle again increased to 151° as shown in (3) of FIG. 8. This is because the surface was treated to have hydrophobicity by the alkyl chain of the second layer.

Figure 9A:
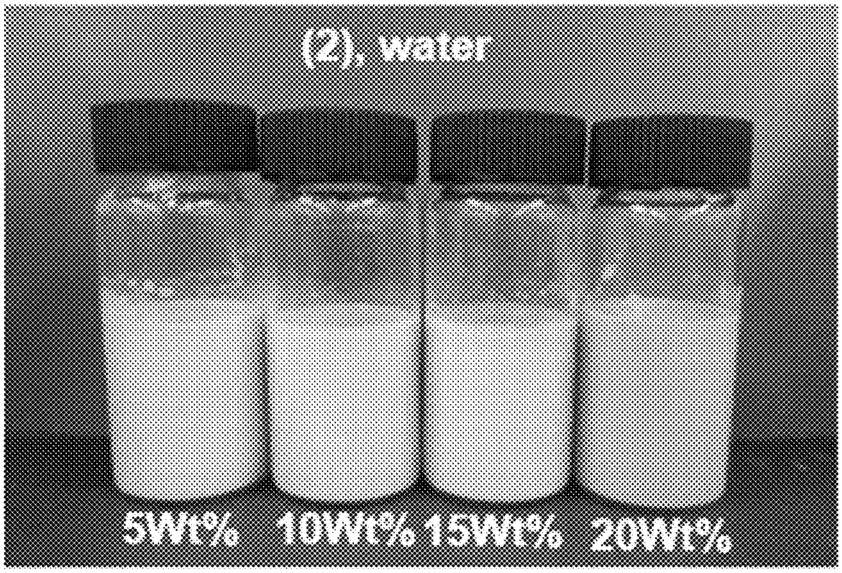
FIG. 9A and FIG. 9B show a photograph showing the dispersion state of the boron nitride nanotubes of FIG. 1 in various solvents.
Figure 9B:
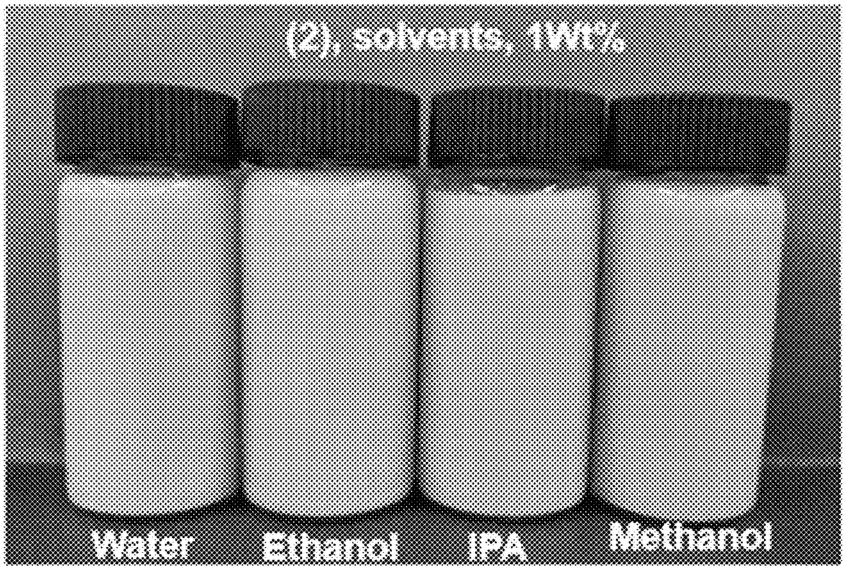

FIG. 9A and FIG. 9B show a photograph showing the dispersion state of the boron nitride nanotubess of FIG. 1 in various solvents; FIG. 9A and FIG. 9B shows the dispersion state of the surface-treated boron nitride nanotubess according to Example 1 (2).

FIG. 9A is a case in which the surface-treated boron nitride nanotubess of Example 1 (2) of FIG. 7 were dispersed in water, with varied contents of the boron nitride nanotubess, and FIG. 9B shows results of dispersing 1 wt % of the surface-treated boron nitride nanotubess in water, ethanol, IPA, and methanol, respectively.

As may be seen in FIG. 9A and FIG. 9B, as a result of surface treating by forming a first layer on the surface of the boron nitride nanotubess to have hydrophilicity, as may be seen in FIG. 9A and FIG. 9B, the dispersion was good in a polar solvent.

Figure 10A:
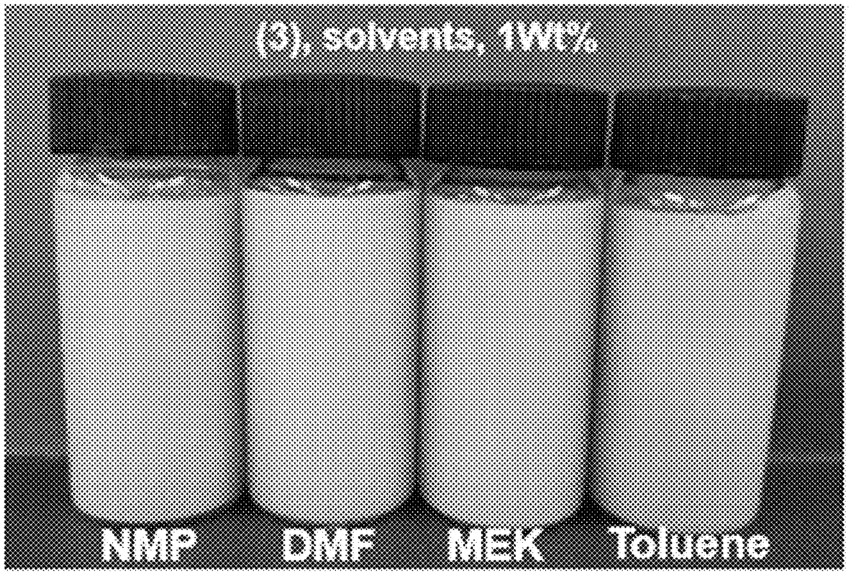
FIG. 10A and FIG. 10B show a photograph showing the dispersion state of the boron nitride nanotubes of FIG. 4 in various solvents.
Figure 10B:
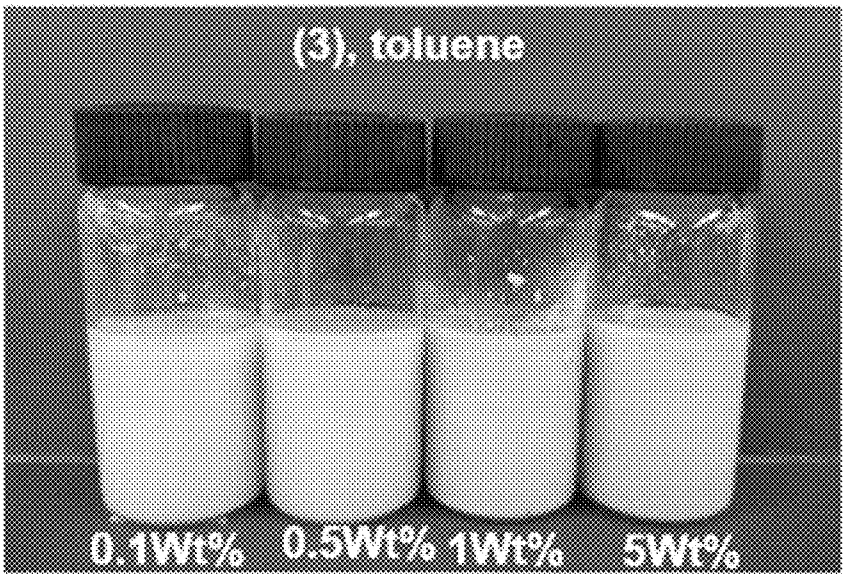

FIG. 10A and FIG. 10B show a photograph showing the dispersion state of the boron nitride nanotubess of FIG. 4 in various solvents. FIG. 10A and FIG. 10B show the dispersion state of the surface-treated boron nitride nanotubess according to Example 2 (3).

FIG. 10A shows results of dispersing 1 wt % of the surface-treated boron nitride nanotubess of Example 2 (3) of FIG. 7 in N-methyl-2-pyrrolidone (NMP), dimethylformamide (DMP), methyl ethyl ketone (MEK), and toluene, respectively, and FIG. 10B shows results of dispersing the surface-treated boron nitride nanotubess in toluene, with varied contents of the surface-treated boron nitride nanotubess.

As may be seen in FIG. 10A and FIG. 10B, in the case of Example 2, which was surface-treated to have hydrophobicity by further forming a second layer, the dispersion in a non-polar solvent was good.

Figure 11A:
FIG. 11A and FIG. 11B show a photograph showing the dispersion state of boron nitride nanotubess according to a comparative example without a surface treatment, in water, ethanol and toluene.
Figure 11B:

FIG. 11A and FIG. 11B show a photograph showing the dispersion state of boron nitride nanotubess according to a comparative example without a surface treatment, in water, ethanol and toluene.

FIG. 11A and FIG. 11B shows results of dispersing the comparative example of FIG. 7 in water, ethanol, and toluene, respectively, and FIG. 11A shows results immediately after dispersing the boron nitride nanotubess in water, ethanol, and toluene, and FIG. 11B shows results when one hour has elapsed after the boron nitride nanotubess were dispersed in water, ethanol, and toluene.

In the case of the comparative example, it may be seen that the boron nitride nanotubess that are not surface-treated have very poor dispersibility in organic and aqueous solvents.

As may be seen from the above, according to the present disclosure, boron nitride nanotubess may be made to be dispersed in a polar or non-polar solvent by treating the surface of the boron nitride nanotubess. In addition, since water is used as a dispersion medium during surface treatment of boron nitride nanotubess, an organic solvent may not be used, and thus environmental pollution is not generated, and by securing dispersibility of boron nitride nanotubess in various solvents by a simple method, usability of boron nitride nanotubess in various fields may be enhanced.

As such, the present disclosure has been described with reference to the embodiments shown in the drawings, but these are merely exemplary, and those skilled in the art will understand that various modifications and variations of the embodiments are possible therefrom. Accordingly, the true scope of the present disclosure should be determined by the technical idea of the appended claims.

According to embodiments of the present disclosure, since boron nitride nanotubess may be surface-treated to have hydrophilicity or hydrophobicity, and thus to be dispersed in various solvents, the usability of boron nitride nanotubess may be improved.

In addition, since water is used as a dispersion medium when the boron nitride nanotubess are surface-treated to have hydrophobicity, it is possible to prevent environmental pollution by not using an organic solvent.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A surface-treated boron nitride nanotubes, comprising:
a boron nitride nanotubes; and
a first layer located on at least a portion of a surface of the boron nitride nanotubes,
wherein the first layer forms Pi ($\pi$) bonds with the boron nitride nanotubes, and the first layer includes hydroxyphenyl groups,
wherein the first layer includes at least one of tannic acid, gallic acid, catechol, epigallocatechin, pyrogallol, hexahydroxydiphenic acid, ellagic acid, or chlorogenic acid, as a polyphenol group.

2. The surface-treated boron nitride nanotubes of claim 1, wherein the surface-treated boron nitride nanotubes is hydrophilic.

3. The surface-treated boron nitride nanotubes of claim 1, further comprising
a second layer on the first layer,
wherein the second layer includes amine groups or thiol groups as hydrocarbon groups.

4. The surface-treated boron nitride nanotubes of claim 3, wherein
the amine groups or thiol groups are added to the hydroxyl groups of the first layer by Michael addition.

5. The surface-treated boron nitride nanotubes of claim 3, wherein
the second layer includes at least one of alkyl amine, alkyl thiol, aryl amine, aryl thiol, benzyl amine, or benzyl thiol.

6. The surface-treated boron nitride nanotubes of claim 3, wherein
the second layer imparts hydrophobicity to the surface-treated boron nitride nanotubes.

* * * * *